United States Patent
Kasireddy et al.

(10) Patent No.: US 11,140,110 B2
(45) Date of Patent: Oct. 5, 2021

(54) ADAPTIVE DIALOG STRATEGY FOR MULTI TURN CONVERSATION SYSTEMS USING INTERACTION SEQUENCES

(71) Applicant: International Business Machines Corporation, Armonk, NY (US)

(72) Inventors: Vinay Kumar Reddy Kasireddy, Danbury, CT (US); Nirmal K. Mukhi, Ramsey, NJ (US); Ravi Tejwani, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/172,016

(22) Filed: Oct. 26, 2018

(65) Prior Publication Data
US 2020/0137014 A1    Apr. 30, 2020

(51) Int. Cl.
*H04L 12/58*    (2006.01)

(52) U.S. Cl.
CPC ............. *H04L 51/16* (2013.01); *H04L 51/04* (2013.01)

(58) Field of Classification Search
CPC ................................. H04L 51/16; H04L 51/04
See application file for complete search history.

(56) References Cited

U.S. PATENT DOCUMENTS

| | | | |
|---|---|---|---|
| 7,039,166 B1 | 5/2006 | Peterson | |
| 7,415,414 B2 | 8/2008 | Azara | |
| 7,457,404 B1 * | 11/2008 | Hession | H04M 3/5175 379/265.07 |
| 8,976,955 B2 * | 3/2015 | Liberman Ben-Ami | H04M 3/5191 379/265.01 |
| 9,082,401 B1 * | 7/2015 | Fructuoso | G10L 13/08 |
| 9,197,736 B2 * | 11/2015 | Davis | G06F 3/04842 |
| 9,431,006 B2 * | 8/2016 | Bellegarda | G10L 15/08 |
| 9,559,993 B2 * | 1/2017 | Palakovich | |
| 9,621,492 B2 * | 4/2017 | Park | H04L 51/046 |
| 10,169,315 B1 * | 1/2019 | Heckel | G06N 3/0454 |
| 10,171,662 B1 * | 1/2019 | Zhou | H04L 51/02 |
| 10,283,110 B2 * | 5/2019 | Bellegarda | G10L 15/08 |
| 10,380,236 B1 * | 8/2019 | Ganu | G06F 17/277 |

(Continued)

OTHER PUBLICATIONS

Bayser et al.,"A Hybrid Architecture for Multi-Party Conversational Systems", arXiv:1705.01214v2 [cs.CL] May 4, 2017, 40 pages.

(Continued)

*Primary Examiner* — William G Trost, IV
*Assistant Examiner* — Monishwar Mohan
(74) *Attorney, Agent, or Firm* — William E. Schiesser

(57) ABSTRACT

A method, computer program product and computer system for recovering from a likely exit condition in an electronic conversation with a user and interactive agent is provided. A processor retrieves one or more messages from a conversation between a user and an interactive agent. A processor determines at least one label for the one or more messages between a user and an interactive agent. A processor compares the at least one label for the one or more messages to a sequence model. A processor identifies the one or more messages from the conversation indicate an exit condition for the user based on the comparison of the at least one label for the one or more messages to the sequence model. A processor sends a recovery message to the user to redirect the conversation.

20 Claims, 6 Drawing Sheets

(56) References Cited

U.S. PATENT DOCUMENTS

| | | | | |
|---|---|---|---|---|
| 2011/0004475 | A1* | 1/2011 | Bellegarda | G10L 15/08 |
| | | | | 704/251 |
| 2014/0164953 | A1* | 6/2014 | Lynch | G06F 3/0481 |
| | | | | 715/753 |
| 2014/0330783 | A1* | 11/2014 | Provencher | G06F 16/2365 |
| | | | | 707/638 |
| 2015/0323989 | A1* | 11/2015 | Bateman | G06F 3/011 |
| | | | | 345/156 |
| 2016/0162474 | A1* | 6/2016 | Agarwal | G06F 17/2765 |
| | | | | 704/9 |
| 2016/0162804 | A1* | 6/2016 | Agarwal | G06N 20/00 |
| | | | | 706/12 |
| 2016/0171511 | A1* | 6/2016 | Goel | G06Q 50/01 |
| | | | | 705/7.29 |
| 2016/0294952 | A1* | 10/2016 | Bodell | G06Q 30/016 |
| 2017/0048170 | A1* | 2/2017 | Smullen | H04L 67/322 |
| 2017/0098443 | A1* | 4/2017 | Bhatt | G06F 17/2785 |
| 2017/0124034 | A1* | 5/2017 | Upadhyay | G06F 17/24 |
| 2017/0324868 | A1* | 11/2017 | Tamblyn | H04M 3/58 |
| 2018/0019981 | A1* | 1/2018 | Leavy | H04L 67/146 |
| 2018/0212904 | A1* | 7/2018 | Smullen | H04L 51/02 |
| 2018/0270290 | A1* | 9/2018 | Sinha | G06F 11/2082 |
| 2018/0307672 | A1* | 10/2018 | Akkiraju | G06N 7/005 |
| 2018/0350395 | A1* | 12/2018 | Simko | G10L 25/78 |
| 2019/0042988 | A1* | 2/2019 | Brown | G06N 20/00 |
| 2019/0052584 | A1* | 2/2019 | Barve | G06F 17/2785 |
| 2019/0088254 | A1* | 3/2019 | Filar | G10L 15/1815 |
| 2019/0140989 | A1* | 5/2019 | Wise | G06F 16/243 |
| 2019/0182649 | A1* | 6/2019 | Best | H04L 67/16 |
| 2019/0213255 | A1* | 7/2019 | Benantar | G06F 16/35 |
| 2019/0227822 | A1* | 7/2019 | Azmoon | G06F 3/0481 |
| 2019/0311036 | A1* | 10/2019 | Shanmugam | G06F 16/951 |

OTHER PUBLICATIONS

Chabernaud, F., "Multimodal Interactions with a Chatbot and study of Interruption Recovery in Conversation", Heriot-Watt University, Masters Thesis, Aug. 2017, 59 pages.

Cronin et al., "Predictive User Interface", An IP.com Prior Art Database Technical Disclosure, IPCOM000184376D, Jun. 22, 2009, 5 pages.

Disclosed Anonymously, "Method and System for Conversational System Configuration Using Machine Reading and Dialog", An IP.com Prior Art Database Technical Disclosure, IPCOM000251873D, Dec. 7, 2017, 5 pages.

D'Mello et al, "The Relationship between Affective States and Dialog Patterns during Interactions with AutoTutor", Journal of Interactive Learning Research, Jan. 2008, 9 pages, <https://www.researchgate.net/publication/268055945_The_Relationship_between_Affective_States_and_Dialog_Patterns_during_Interactions_with_AutoTutor>.

IBM, "Method of Transferring Modalities in a Dialog", An IP.com Prior Art Database Technical Disclosure, IPCOM000137136D, Jun. 9, 2006, 2 pages.

Yu et al., "An Open-source Dialog System with Real-Time Engagement Tracking for Job Interview Training Applications", Ulm University, IWSDS, 2017, pp. 1-9.<https://www.uni-ulm.de/fileadmin/website_uni_ulm/iui.iwsds2017/papers/IWSDS2017_paper_30.pdf>.

* cited by examiner

ADAPTIVE DIALOG STRATEGY FOR MULTI TURN CONVERSATION SYSTEMS USING INTERACTION SEQUENCES

BACKGROUND OF THE INVENTION

The present invention relates generally to the field of interactive agents, and more particularly to message pattern matching.

Interactive agents, or chat agents, are programs that conduct conversations with a user via either text or auditory messages. Such programs typically imitate human speech as to act as another human is interacting with the user. Interactive agents are typically used in dialog systems for various practical purposes including customer service or information acquisition. Some agents use sophisticated natural language processing systems to interpret what a user is saying, in both in content, via knowledge-based systems (KBSs), and inflection, via sentiment analysis.

SUMMARY

Embodiments of the present invention provide a method, system, and program product to recover from unwanted conditions in an electronic conversation with a user and interactive agent is provided. A processor retrieves one or more messages from a conversation between a user and an interactive agent. A processor determines at least one label for the one or more messages between a user and an interactive agent. A processor compares the at least one label for the one or more messages to a sequence model. A processor identifies the one or more messages from the conversation indicate an exit condition for the user based on the comparison of the at least one label for the one or more messages to the sequence model. A processor sends a recovery message to the user to redirect the conversation.

DETAILED DESCRIPTION

Figure 1:
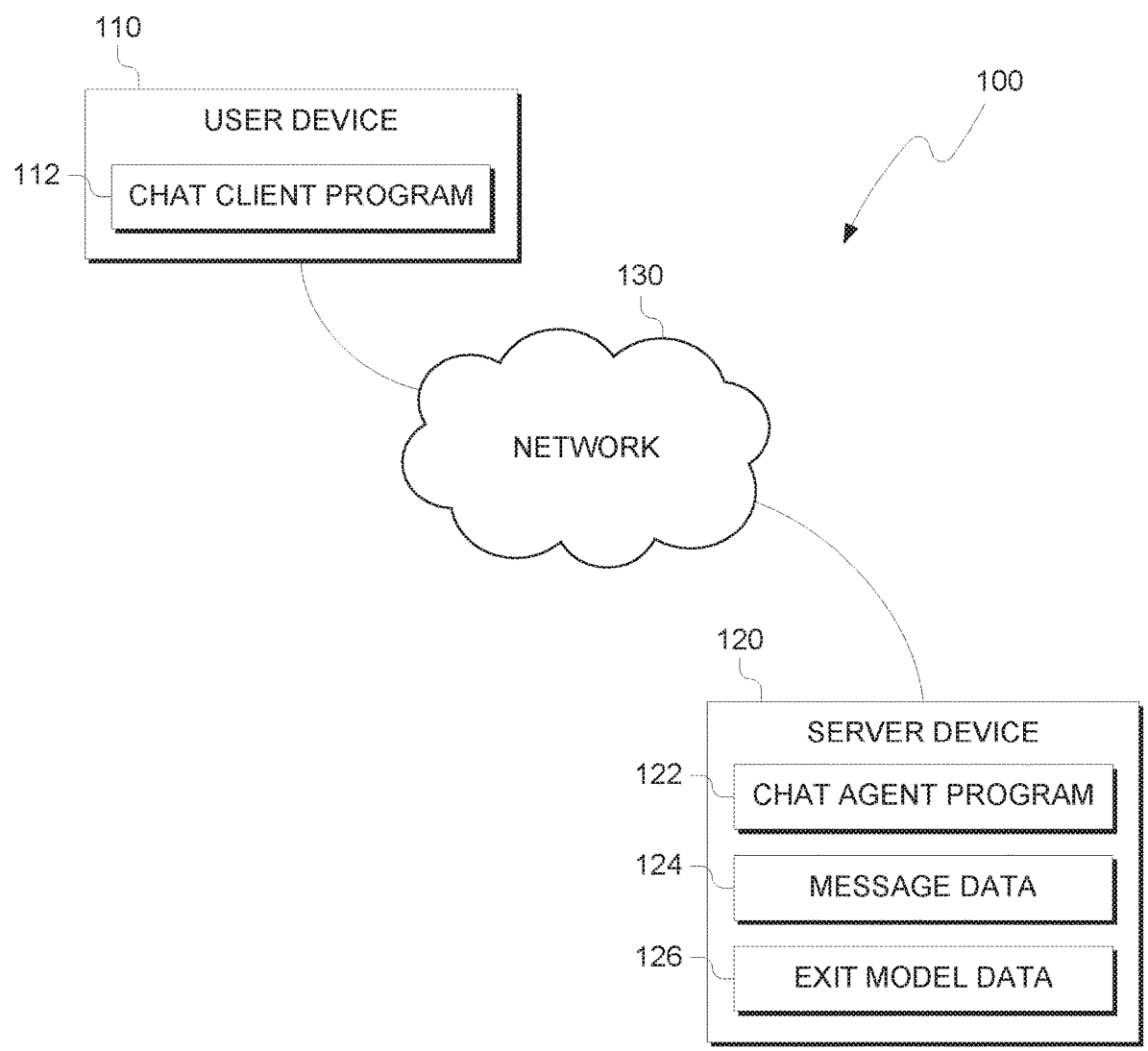
FIG. 1 is a functional block diagram illustrating a networked environment, in accordance with an embodiment of the present invention.

While solutions to generating convincing conversations between a user and a chat agent program are known, prior solutions lack mechanisms to detect and predict when a user is unsatisfied with the dialog and may quit the conversation. Embodiments of the present invention provide improvements to interactive agents by continuously monitoring a conversation between the user and the agent in order to identify exit conditions that may develop during the conversation. When such an exit condition is detected, then the agent determines a strategy to redirect the conversation in order to prevent the user from quitting the conversation. Embodiments of the present invention improve prior interactive agents by keeping the user engaged as well as provide updates to incorrect classifications that may have caused the exit condition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110 and server device 120 connected over network 130. User device 110 includes chat client program 112. Server device 120 includes chat agent program 122, message data 124 and exit model data 126.

In various embodiments of the present invention, user device 110 and server device 120 are each a computing device that can be a standalone device, a server, a laptop computer, a tablet computer, a netbook computer, a personal computer (PC), or a desktop computer. In another embodiment, server device 120 represents a computing system utilizing clustered computers and components to act as a single pool of seamless resources. In general, user device 110 and server device 120 can be any computing device or a combination of devices with access to message data 124 and exit model data 126 and is capable of executing chat client program 112 and chat agent program 122. User device 110 and server device 120 may each include internal and external hardware components, as depicted and described in further detail with respect to FIG. 6.

In this exemplary embodiment, chat client program 112 is stored on user device 110. Chat agent program 122, message data 124 and exit model data 126 are stored on server device 120. However, in other embodiments, chat client program 112, chat agent program 122, message data 124 and exit model data 126 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between user device 110 and server device 120, in accordance with a desired embodiment of the present invention.

In various embodiments, chat client program 112 provides a user interface for a user to communicate with chat agent program 122. For example, chat client program 112 provides a message dialog interface such as the example message dialog 410 depicted in FIG. 4. Chat client program 112 receives input from a user to collect and send messages to chat agent program 122. In some scenarios and embodiments, chat client program 112 receives text-based input collected from an input device connected to user device 110 or a software-based input provided by chat client program 112 such as a virtual keyboard. In other scenarios and embodiments, chat client program 112 receives audio-based input collected from an input device connected to user device 110, such as a microphone. One of ordinary skill in the art will appreciate that any type of input device or interface may be used to collect messages from a user without deviating from the invention.

In various embodiments, chat client program 112 provides an interface for a user to have a conversation with chat agent program 122. A conversation includes a series of messages from both the chat client program 112 and the chat agent program 122. In some embodiments and scenarios, a user of chat client program 112 initiates a conversation with chat agent program 122. For example, chat agent program 122 provides a digital assistant service where chat agent program 122 answers questions and performs operations on behalf of the user. In some embodiments and scenarios, chat agent program 122 initiates a conversation with a user of chat client program 112. For example, chat agent program 122 provides a tutoring or teaching service that guides the user in a learning experience regarding various topics. One of ordinary skill in the art will appreciate that the conversation flow may originate from a user or chat agent program 122, and may change throughout the conversation, without deviating from the invention.

In various embodiments, chat agent program 122 stores received messages from a user of chat client program 112 in message data 124. For each message, chat agent program 122 analyzes message data 124 to determine the content of each message. For example, chat agent program 122 performs natural language processing (NLP) on received messages in messages data 124 to determine the content of the messages received from a user. One of ordinary skill in the art will appreciate that any technique or implementation of NLP may be used to determine the semantic content of message data 124 without deviating from the invention such as, but not limited to, Segmentation and Parsing, Feature Extraction, Word Sense Disambiguation (WSD), Natural Language Interpretation (NLI), and Sentiment Analysis.

In various embodiments, chat agent program 122 includes, or has access to, one or more knowledge database systems (KBS). A KBS includes various knowledge-bases that cover a variety of domain specific topics that chat agent program 122 may discuss with a user of chat client program 112. For example, chat agent program 122 provides a tutoring service to teach a user about ancient history. The KBS includes a knowledge-base for various topics associated with ancient history, such as structured data (e.g., machine readable information such as tabularized data or strings) or unstructured data (e.g., various articles and other human readable information of which NLP is utilized to determine content of the articles) regarding domain specific topics such as Greek or Egyptian History.

In various embodiments, chat agent program 122 engages in a conversation with a user of chat client program 112. In some embodiments and scenarios, chat agent program 122 initiates the conversation. For example, chat agent program 122 asks a user of chat client program 112 a question, prompting a response from the user. In some embodiments and scenarios, a user of chat client program 112 initiates the conversation either with a request or question, prompting a response from chat agent program 122. In various embodiments, each of the chat agent program 122 and user of chat client program 112 take turns in the conversation sending responses, questions or other types of messages. In such embodiments, the user and chat agent program 122 participate in a multi-turn conversation, comprising multiple messages from both.

In various embodiments, chat agent program 122 identifies a sequence of messages from the various responses from the conversation stored in message data 124. In some embodiments and scenarios, chat agent program 122 identifies a sequence of messages based on a current topic or task being discussed in the conversation. For example, in a scenario where chat agent program 122 is providing a tutoring or teaching service for the user, chat agent program 122 identifies a sequence of messages based on the beginning of when the topic was first discussed or introduced with the user. As another example, in a scenario where chat agent program 122 is providing a digital assistant service, chat agent program 122 identifies a sequence of messages based on when a user issues a request or question to chat agent program 122. In some embodiments and scenarios, chat agent program 122 identifies a sequence of messages that includes multiple topics, questions or instructions. For example, chat agent program 122 identifies a sequence of messages that includes the last two topics discussed, including the initial messages and the intervening responses from both chat agent program 122 and the user of chat client program 112.

In various embodiments, chat agent program 122 classifies the messages sent from a user of chat client program 112. In some embodiments and scenarios, chat agent program 122 assigns one or more labels to messages sent by the user to chat agent program 122. The labels identify the intent of the message sent by the user. In some embodiments and scenarios, chat agent program 122 performs sentiment analysis on the message data 124 to determine a label for each message. For example, chat agent program 122 assigns a "frustrated" label to a message stating "I already told you". As another example, chat agent program 122 assigns a "satisfied" label to the message "Thank you". In some embodiments and scenarios, chat agent program 122 performs syntactical and semantical analysis to generate a label identifying the type or structure of a message sent by a user. Based on the structure and grammar of the message, chat agent program 122 identifies a label for the type of message. For example, chat agent program 122 assigns a "question" label to a message stating "Could you tell me more about George Washington?". As another example, chat agent program 122 assigns a "answer" label to a message stating "That would be Topeka". Examples intent labels include, but are not limited to, "Question", "Answer", "Instruction", "Operation", "Bored", "Frustrated", "Excited", "Calm", "Withdrawal" or "Confused". In some embodiments and scenarios, chat agent program 122 classifies a message with more than one label. For example, assigns both a "answer" label and a "confused" label to a message stating "I'm guessing that would be 144".

In various embodiments and scenarios, chat agent program 122 determines one or more metadata identifiers for each message in message data 124. For example, chat agent program 122 identifies the time from when a message is sent by chat agent program 122 to the time a response message is received from the user of chat client program 112. The response time from the user for messages sent by chat agent program 122 indicates the attentiveness of the user, where long delays between responses may indicate that the user is losing interest or confused. Another example of metadata determined based on message data 124 by chat agent program 122 is the mastery or understanding of the messages sent by the user. In some embodiments, chat agent program 122 identifies the mastery of the response based on the completeness or correctness of the response. For example, chat agent program 122 assigns a higher master level to the answer "Albert Einstein" compared to an answer "Einstein" to the question of "Who discovered the theory of relativity?". In another example, chat agent program 122 assigns a higher mastery metadata value to answers with correct spelling. answers within a certain value range for accuracy when compared to the correct answer. For example, if a mathematics-based question was asked and the expected answer is "3.75" but the user sends a message with "3.8", then chat agent program 122 may count the answer as correct but assign a lower mastery score.

In various embodiments, chat agent program 122 determines a strategy based on the responses given by a user. Based on message data 124, chat agent program 122 determines a strategy for a response to the user's message. In various embodiments, chat agent program 122 determines the content of messages in message data 124 to determine a proper response strategy. For example, in scenarios where chat agent program 122 prompts the user with a question, the content of the user response message is determined. If the content matches an expected answer, then chat agent program 122 determines that a strategy to move onto the next question or, in other scenarios, to ask another more detailed question about the same topic. In another example, in scenarios where chat agent program 122 receives a message from the user, then chat agent program 122 determines a response strategy to answer the user's question. Based on the determined strategy and contents of message data 124, chat agent program 122 generates a response to the user's message.

In various embodiments, chat agent program 122 creates one or more subsequences of user messages from the sequence of messages received from a user of chat client program 112. In some embodiments and scenarios, chat agent program 122 separates a sequence of messages into one or more groups of sub-sequences. For example, a sequence of messages between a user of chat client program 112, indicated by $U_x$, and chat agent program 122, indicated by $A_y$, may be represented as the following sequence ($U_1$, $A_1$, $U_2$, $A_2$, $U_3$, $A_3$, $U_4$, $A_4$), which are used to generate subsequences of messages. In general, a subsequence includes a portion of the total messages included in an original sequence of messages. Continuing with the previous example, the generated subsequences include ($U_1$, $U_2$, $U_3$, $U_4$), ($U_1$, $U_2$), ($U_3$, $U_4$), ($U_1$, $U_3$, $U_4$). In the foregoing example, some of the subsequences of user messages selected by chat agent program 122 (i) span the entirety of the conversation (e.g., ($U_1$, $U_2$, $U_3$, $U_4$)), (ii) include a subset of the conversation in a received order (e.g., ($U_1$, $U_2$), ($U_3$, $U_4$)), or (iii) include a sequence of messages with certain responses omitted from the subsequence (e.g., ($U_1$, $U_3$, $U_4$)). One of ordinary skill in the art will appreciate that that any methodology of subsequence selection for a sequence of user messages with chat agent program 122 may be utilized without deviating from the invention.

In various embodiments, chat agent program 122 compares the labels and metadata for one or more subsequences to exit model data 126 to determine if a sequence of messages from the user may indicate an exit condition from the user. An exit condition is a sequence of responses and metadata regarding the responses received from the user that indicate that the user may exit or abruptly quit the conversation with chat agent program 122. For example, a user may become frustrated with the messages provided by chat agent program 122 and stop conversing with chat agent program 122. By detecting such exit conditions prior to the act of the user exiting the conversation, chat agent program 122 can redirect the conversation to prevent the user from quitting the conversation. When such subsequences are detected, chat agent program 122 generates an exit prevention strategy for the current message turn between chat agent program 122 and the user. When such a strategy is determined, chat agent program 122 will provide messages that will either disambiguate the current task or topic, or chat agent program 122 will rephrase the current task or topic.

Figure 5:
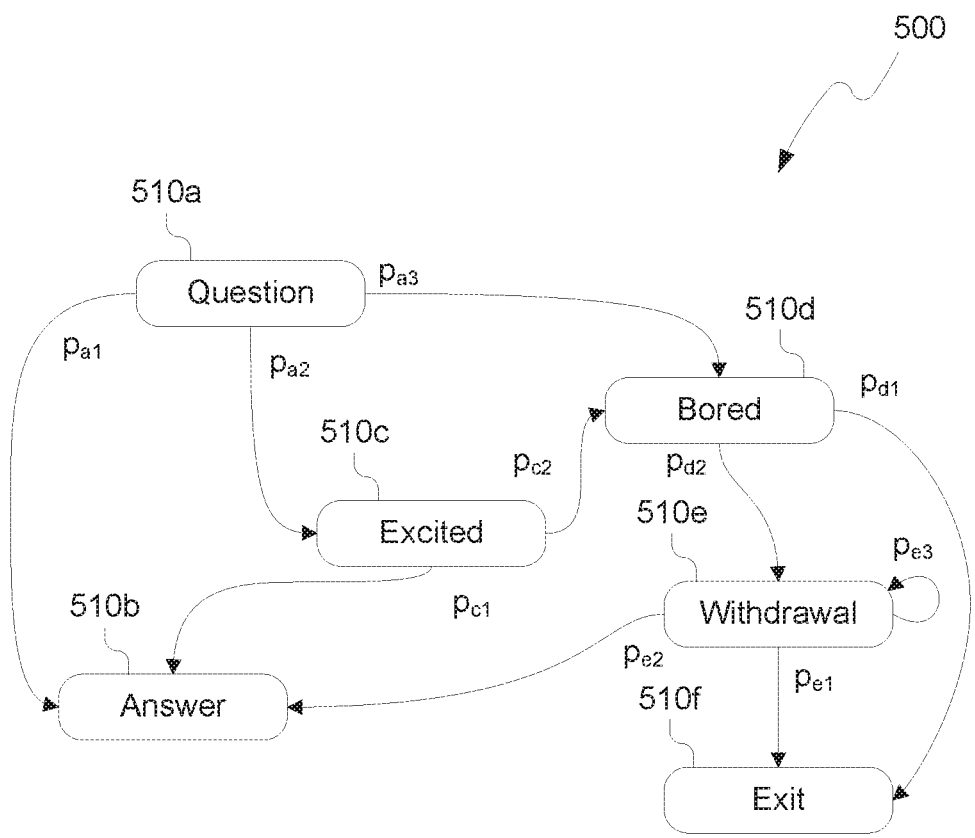
FIG. 5 depicts an example exit sequence model, in accordance with an embodiment of the present invention.

In various embodiments, exit model data 126 includes a state-based sequence model such as a Markov Chain or Markov Process Model. The state-based sequence model includes a series of states or nodes that represent labels for the various different types message labels. Each state representing the various labels of messages intent (e.g., "Question", "Answer", "Frustrated", "Bored", etc.) has one or more paths connecting the labels. Each path or set of paths between a set of labels represents a potential subsequence in the conversation between a user and chat agent program 122. The paths between each label represent a probability the next user turn in the conversation will result in a response from the user that matches the subsequent label. FIG. 5 depicts a non-limiting example with labels 510a-f and state transitions or paths between labels 510a-f. In some embodiments and scenarios, the probabilities or paths between labels are based on response metadata such as response mastery and response time as part of exit model data 126 (depicted as $p_{a1}$, $p_{a2}$, $p_{a3}$, $p_{b1}$, etc.). In further embodiments, the probabilities for label sequence state changes based on the length of response time from the user or the user's response mastery.

In various embodiments, chat agent program 122 generates exit model data 126 based on a set of training data. In some embodiments, chat agent program 122 generates exit model data 126 based on a supervised training machine learning algorithm. In these embodiments, training data includes labeled sequences of messages indicated from an external source. Chat agent program 122 analyzes the training data to create various subsequences of the training data. Chat agent program 122 determines the label sequence changes for each subsequence to determine one or more probabilities between each label state (e.g., labels 510a-f of FIG. 5). In some embodiments, chat agent program 122 generates exit model data 126 based on an unsupervised training machine learning algorithm. In these embodiments, training data includes unlabeled or unstructured message from an external source. Chat agent program 122 classifies and labels the messages. Chat agent program 122 then analyzes the machine labeled training data to create various subsequences of the training data. Chat agent program 122 determines the label sequence changes for each subsequence to determine one or more probabilities between each label state.

In various embodiments, chat agent program 122 compares labels and metadata for messages message data 124 to exit model data 126 to determine if a current sequence or subsequence of messages are likely to lead to an exit condition in the conversation. For each sequence or subsequence of messages, chat agent program 122 identifies the labels that match the messages in exit model data 126. Based on the labels, chat agent program 122 determines the likelihood that a future message may lead to an exit condition. Looking at FIG. 5, chat agent program 122 maps sequence or subsequence labels to exit model data 126. For example, a subsequence of messages is labeled as "Question" to "Bored" to "Withdrawal". The current sequence state is "Withdrawal" Label 510e. Chat agent program 122 determines the likelihood or probabilities $p_{e1}$, $p_{e2}$, and $p_{e3}$ that the next message will have the label "Answer", "Exit" or "Withdrawal". Based on the non-limiting example, a set of training data trained exit model data 126 with the values of $p_{e1}=0.7$, $p_{e2}=0.2$, and $p_{e3}=0.1$. In this example, the likely or more probable path is $p_{e1}$ which indicates the state in the sequence of messages from the user will likely be an exit condition. When such a state is likely, chat agent program 122 determines that an "exit prevention" strategy is urgent. In response, chat agent program 122 will send to the user a message to prevent the user from exiting or quitting the conversation.

In some embodiments, chat agent program 122 modifies the determined probabilities for state changes in exit model data 126 based on one or more metadata values associated with a sequence or subsequence of message data 124. For example, longer response times may increase paths or probabilities to negative labels or states of exit model data 126, such as "Bored" (e.g., $p_{a3}$ or $p_{c2}$ in FIG. 5), "Withdrawal" (e.g., $p_{d2}$ or $p_{e3}$), or "Exit" (e.g., $p_{e1}$ or $p_{d1}$). Conversely, short or quick responses may increase probabilities to positive labels of exit model data 126 such as "Excited" (e.g., $p_{a2}$ of FIG. 5) or "Answer" (e.g., $p_{c1}$). As another example, the mastery of a response from a user may increase probabilities to positive labels of exit model data 126 such as "Excited" (e.g., $p_{a2}$ of FIG. 5) or "Answer" (e.g., pa). Conversely, incorrect or poorly worded responses may increase paths or probabilities to negative labels or states of exit model data 126 "Bored" (e.g., $p_{a3}$ or $p_{c2}$ in FIG. 5), "Withdrawal" (e.g., $p_{d2}$ or $p_{e3}$), or "Exit" (e.g., $p_{e1}$ or $p_{d1}$).

In various embodiments, chat agent program 122 sends a recovery message to the user when a likely exit condition is determined. Chat agent program 122 identifies the current topic or operation being discussed in the conversation to redirect the conversation. In some embodiments and scenarios, chat agent program 122 repeats a question that started the conversation. In other embodiments and scenarios, chat agent program 122 prompts the user to restate or rephrase the topic or last answer the user initial discussed. For example, chat agent program 122 sends a message stating "You seem to be frustrated. What do you think the answer was again?", where the last label state is used to notify the user's last intent. In other embodiments and scenarios, chat agent program 122 prompts with a message attempting to disambiguate the user's previous messages. For example, chat agent program 122 sends a message stating "Hey, looks like our conversation is off the track. Did I misunderstand that you've asked a question? Were you giving a response".

In various embodiments, by sending the recovery message chat agent program 122 determines if the new response messages from the user changes the content of the conversation. In some scenarios, chat agent program 122 identifies that a previous message was misclassified or labeled. For example, chat agent program 122 provides a tutor service and asks the questions "Which U.S. president appears on the front of the $2 bill?". The user states "Is that Thomas Jefferson?". Based on the syntax and semantics of the message, chat agent program 122 may incorrectly label the message as a question. In these scenarios, chat agent program 122 may make an incorrect assumption and rephrase the question again, determining that the user did not answer the question. When this type of mislabeling occurs, the conversation between the user may devolve or get off track, leading to an exit event. In these instances, chat agent program 122 detects the exit condition and either restates the questions or asks the user to disambiguate a previous response. Based on the new message, chat agent program 122 reclassifies the message with a different label. In this example, chat agent program 122 determines that the previous message "Is that Thomas Jefferson?" was misclassified as a question and instead was an answer. In some embodiments, chat agent program 122 updates exit model data 126 or a machine learning classification algorithm to correct the mislabeling of the initial message. In some embodiments, chat agent program 122 sends the message, conversation or subsequence thereof, to an external source along with the correct label classification to be used in supervised training of other interactive agents.

Figure 2:
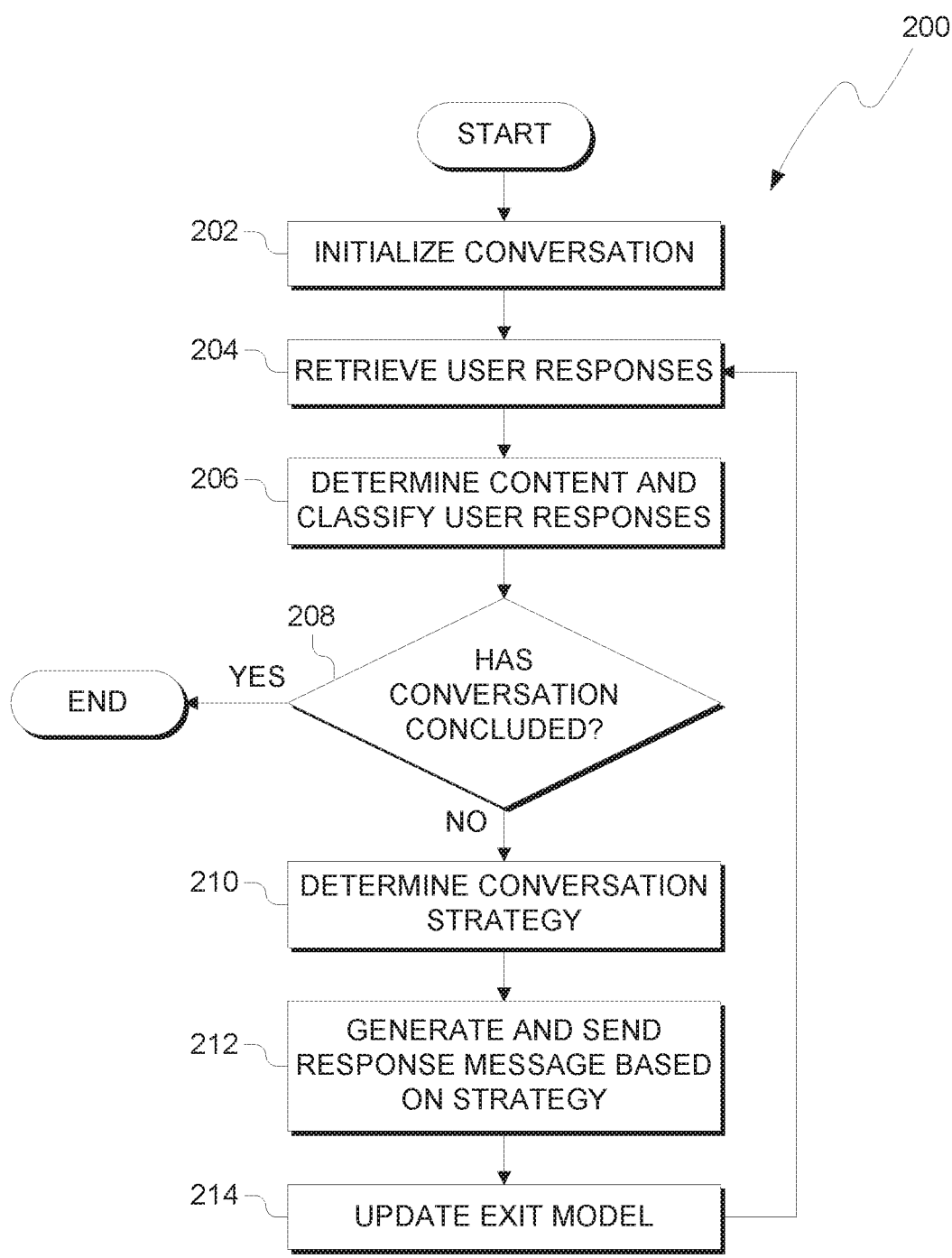
FIG. 2 illustrates operational processes of a chat agent program, on a computing device within the environment of FIG. 1, in accordance with an embodiment of the present invention.

FIG. 2 illustrates operational processes, generally designated 200, of chat agent program 122, on server device 120 within the environment of FIG. 1. In process 202, chat agent program 122 initializes a conversation with a user. In some embodiments and scenarios, chat agent program 122 sends an initial message to a user of chat client program 112. In some embodiments and scenarios, chat agent program 122 receives an initial message from a user of chat client program 112. Once a conservation is initialized, chat agent program 122 one or more messages received from the user during the conversation (process 204). In some embodiments and scenarios, chat agent program 122 retrieves the last message sent by the user. In other embodiments and scenarios, chat agent program 122 retrieves one or more user messages as a sequence of messages from the user.

In process 206, chat agent program 122 determines the content of one or more user messages and classifies the response with one or more labels. Chat agent program 122 utilizes natural language processing to determine the content and intent of the user's messages. Based on the content and intent of the messages, chat agent program 122 determines one or more labels for at least one message. In process 208, chat agent program 122 determines if the conversation has concluded. If the conversation has concluded, then the process ends (YES decision of process 208) such as when the user has disconnected or exited the conversation. If the conversation is ongoing (NO decision of process 208), then chat agent program 122 determines a conversation strategy (process 210).

In process 210, chat agent program 122 determines a conversation strategy to utilize when generating a response to the user's messages. Based on the content, intent, and label, chat agent program 122 determines a strategy to generate a response to the user's messages. In some scenarios, based on the sequence of messages and the classified labels of the messages, chat agent program 122 determines that the user is likely to exit or end the conversation and an exit condition may occur.

Figure 3:
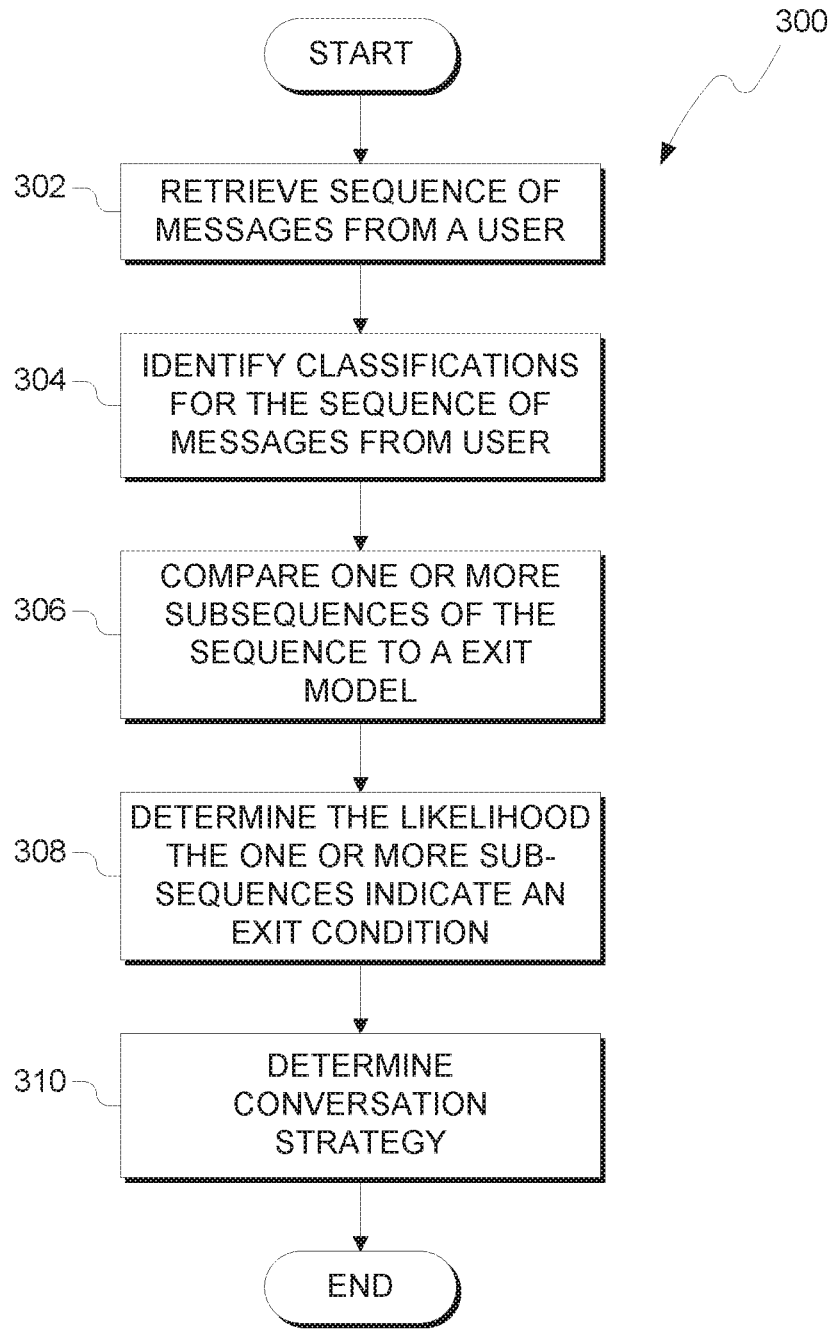
FIG. 3 illustrates operational processes of a chat agent program to determining a conversation strategy, on a computing device within the environment of FIG. 1, in accordance with an embodiment of the present invention.

FIG. 3 illustrates operational processes, generally designated 300, of chat agent program 122 when determining a conversation strategy. In process 302, chat agent program 122 retrieves a sequence of messages stored in message data 124. For example, chat agent program 122 retrieves recent messages made by the user based on a current topic being discussed or request being performed. As another example, chat agent program 122 retrieves a predetermined number of recent messages from message data 124. In process 304, chat agent program 122 identifies the labels determined for messages in process 206 of FIG. 2 for the retrieved sequence of messages.

In process 306, chat agent program 122 selects one or more subsequences of the retrieved messages. For example, in process 302 chat agent program 122 selects messages M1, M2, M3 and M4. Chat agent program 122 selects the following subsequences (i) M1, M2, M3 and M4, (ii) M2, M3, M4; (iii) M3 and M4; and (iv) M2 and M4. In this non-limiting example, chat agent program 122 selects four subsequences for analysis. One of ordinary skill in the art will appreciate that the various subsequences will provide for improved sequence matching. In some scenarios, chat agent program 122 may incorrectly assign a label based on an improper analysis of the content or intent of a message. By choosing one or more subsequences of a sequence, errors in incorrect labeling can be mitigated. For example, by pruning or removing one or more messages, an incorrect labeling made in process 206 of FIG. 2 can be removed to lessen the impact incorrect labeling during analysis.

Based on the selected subsequences, chat agent program 122 compares the subsequences to exit model data 126 (process 306). In process 308, chat agent program 122 determines the likelihood that a future message or action made by the user will result in an exit condition in the conversation. For each subsequence, chat agent program 122 matches the subsequence to one or more label states in the exit model data 126. Based on the matching states, chat agent program 122 determines a probable label for the next possible message or action to be taken by the user. If the likelihood exceeds a predetermined amount that the next label state in exit model data 126 is an "Exit" state, then chat agent program 122 determines that an exit recovery strategy is needed (Process 310). If the likelihood that the next possible message or action to be taken by the user is another state other than "Exit", then chat agent program 122 determines that a continue conversation strategy is needed (Process 310). In some embodiments and scenarios, chat agent program 122 changes the output probabilities for labels in exit model data 126 based on metadata for each response.

Returning to FIG. 2, based on the determined strategy, chat agent program 122 generates and sends a response to the user based on the determined strategy in process 210. In process 212, chat agent program 122 generates a response based in the determined strategy. For a continue conversation strategy, chat agent program 122 identifies the content of the previous messages sent from the user. Based on the content of the messages, determines a response based on the information provided in the message. Chat agent program 122 compares the content to one or more Knowledge Based Systems (KBS) to generate a response to continue the conversation. One of ordinary skill in the art will appreciate that any type of expert system or cognitive system may be used to generate responses to continue a conversation without deviating from the invention, such as, but not limited to neural networks, inference engines, and other types of expert systems.

For an exit recovery strategy, chat agent program 122 generates a response to redirect the conversation. In some embodiments, chat agent program 122 repeats a question that started the conversation. In other embodiments and scenarios, chat agent program 122 prompts the user to restate or rephrase the topic or last answer the user initial discussed. In some embodiments, chat agent program 122 updates exit model data 126 based on the sequences or subsequences of labels found in message data (process 214). For example, chat agent program 122 retrain exit model data 126 using the current sequence labels. If an incorrect label is determined in response to the message provided in process 212, then chat agent program 122 utilizes the new label for the incorrectly labelled message. Based on the sequence of labels, the path probabilities (e.g., $p_{a1}$, $p_{c1}$, etc.) are updated to reflect any changes the sequence or subsequences may have in comparison to exit model data 126. In some scenarios, chat agent program 122 stores more than one exit model data 126 for each user chat agent program 122 interacts with in conversation. In such scenarios, exit model data 126 may be trained over time to cater to the user's particular response patterns.

Figure 4:
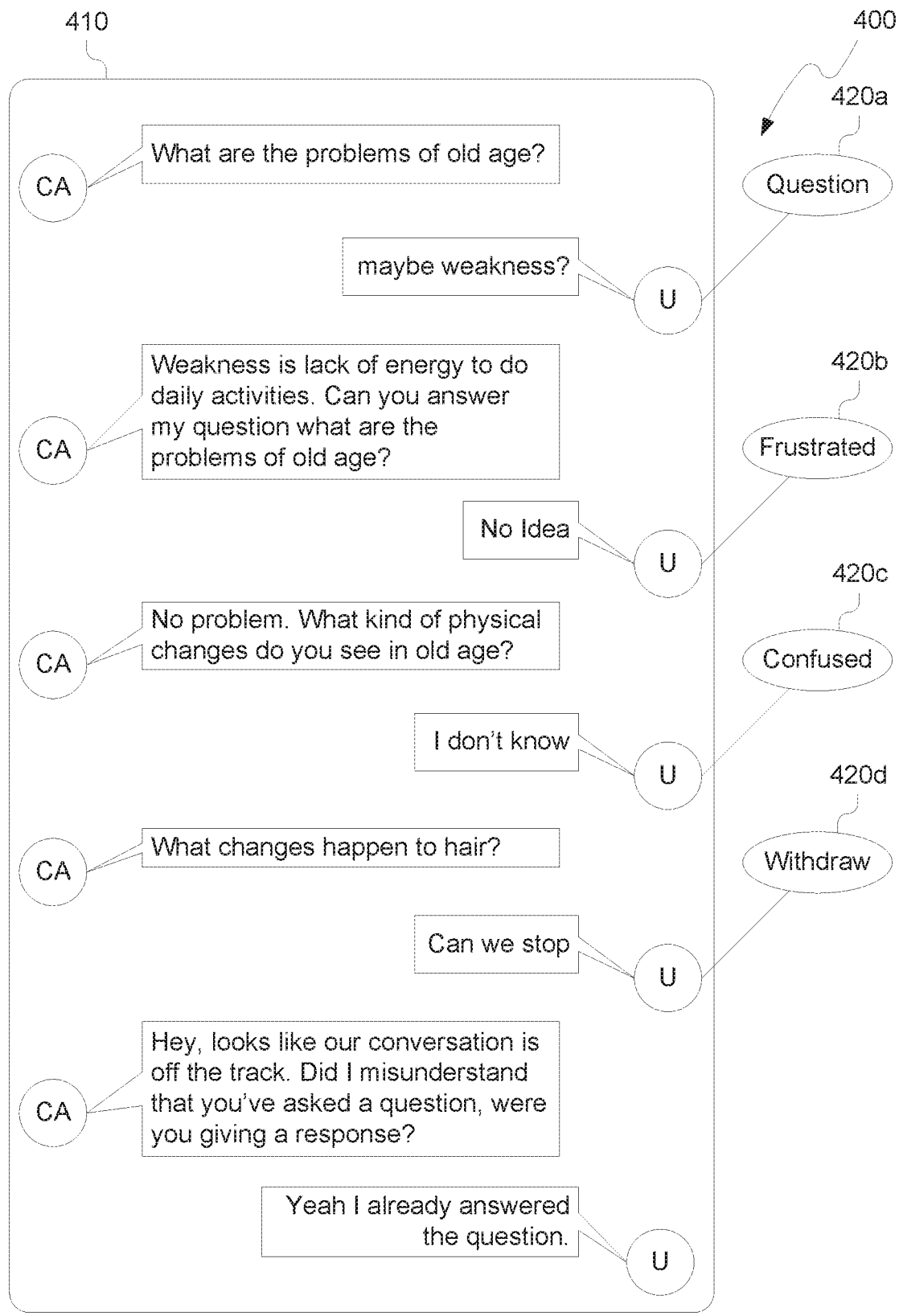
FIG. 4 depicts an example message dialog between a user and a chat agent, in accordance with an embodiment of the present invention.

FIG. 4 depicts an example message dialog 400 between a user of chat client program 112 and chat agent program 122. Dialog 410 includes messages sent by the user "U" and messages sent by chat agent program 122 "CA". Labels 420a-d illustrate the labels assigned to each response. In this example dialog 400, the user is prompted with a question "What are the problems of old age?". In response, the user answers "maybe weakness?". Based on the syntax and semantics of the message, chat agent program 122 classifies the message of the "Question" label 420a. However, chat agent program 122 was incorrect. This leads to the following responses that through sentiment analysis determine the user is "Frustrated" (420b) "Confused" (420c) and "Withdraw" (420d). As discussed herein, chat agent program 122 is constantly and automatically comparing the sequence, or subsequences thereof, of messages in a conversation to determine a potential exit condition. After the user provides the message "Can we stop" that is assigned the "Withdraw" label by chat agent program 122, chat agent program 122 determines that an exit condition may likely occur. In order to redirect the user, chat agent program 122 provides a disambiguation prompt that allows the user the disambiguate the "Question" label 420a initially assigned. Based on the user's next response, chat agent program 122 determines that the classification was incorrect and relabels the prior message. In some scenarios, chat agent program 122 updates one or more machine learning algorithms used in classification and labeling of messaging to account for the error.

FIG. 5 depicts an exit sequence model 500. Exit Sequence Model 500 includes labels 510a-510f. Labels 510a-510f represent the different labels or classification of messages. Each label represents a state in a potential sequence or subsequence of messages. For example, a series of messages may form a sequence that stats at "Excited" (510c), leading to "Bored" (510d) and ending at "Withdrawal" (510e). Once chat agent program 122 compares a sequence of labels and identifies the sequence to labels in exit sequence model 500 that matches, chat agent program 122 then determines the next possible step, i.e., predicted step(s), in the sequence of messages. The "Withdrawal" state has three exit paths (i.e., $p_{e1}$, $p_{e2}$, and $p_{e3}$). Each path is assigned a probability of occurrence. As discussed herein, chat agent program 122 generates exit sequence model 500 based on supervised, unsupervised, or semi-supervised training. The training set uses logs of previously made message logs to determine the frequency of stat or label changes in the training set.

Figure 6:
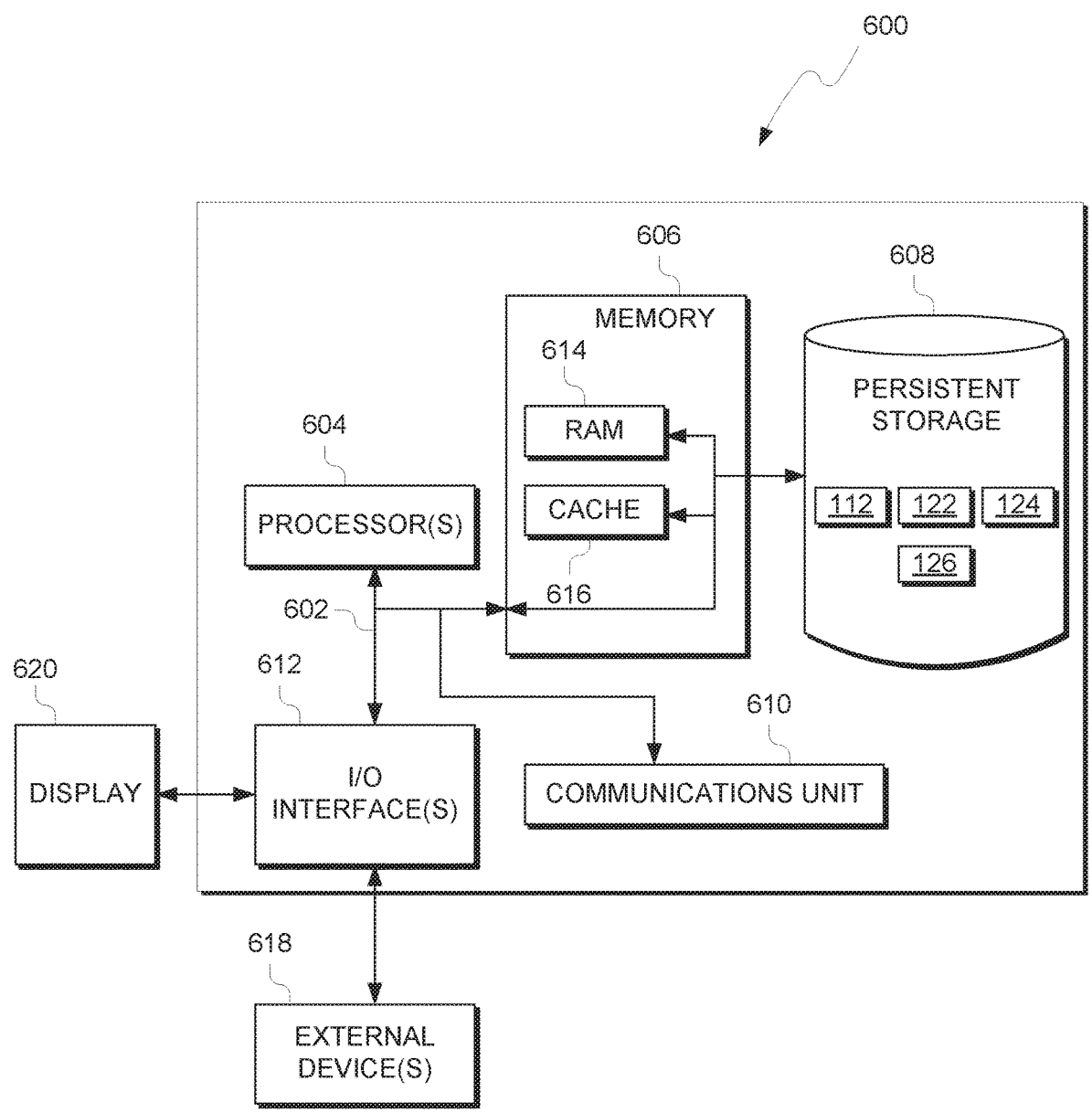
FIG. 6 depicts a block diagram of components of the computing device executing a chat agent program, in accordance with an exemplary embodiment of the present invention.

FIG. 6 depicts a block diagram, 600, of components of user device 110 and server device 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

User device 110 and server device 120 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Chat client program 112, chat agent program 122, message data 124, and exit model data 126 are stored in persistent storage 608 for execution and/or access by one or more of the respective computer processors 604 via one or more memories of memory 606. In this embodiment, persistent storage 608 includes a magnetic hard disk drive.

Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. Chat client program 112, chat agent program 122, message data 124, and exit model data 126 may be downloaded to persistent storage 608 through communications unit 610.

I/O interface(s) 612 allows for input and output of data with other devices that may be connected to user device 110 or server device 120. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., chat client program 112, chat agent program 122, message data 124, and exit model data 126, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
    retrieving, by one or more processors, one or more messages from a conversation between a user and an interactive agent;
    determining, by the one or more processors, at least one label for the one or more messages between a user and an interactive agent;
    comparing, by the one or more processors, the at least one label for the one or more messages to a sequence model;
    identifying, by the one or more processors, the one or more messages from the conversation provided by the user indicate an exit condition for the user based, at least in part, on the comparison of the at least one label for the one or more messages to the sequence model; and
    sending, by the one or more processors, a recovery message to the user to redirect the conversation, wherein (i) the recovery message includes a rephrasing of at least one of the one or more messages from the conversation between the user and the interactive agent and (ii) the recovery message is based, at least in part, on the exit condition associated with the one or more messages from the conversation provided by the user.

2. The method of claim 1, wherein identifying the one or more messages from the conversation indicate an exit condition further comprises:
    determining, by the one or more processors, at least one likelihood of a next state in the sequence model.

3. The method of claim 2, wherein the at least one likelihood of a next state in the sequence model is based, at least in part, on a matching sequence between (i) the at least on label for the one or more messages between a user and an interactive agent and (ii) at least one sequence in the sequence model.

4. The method of claim 3, wherein the at least one likelihood of a next state in the sequence model is further based, at least in part, on at least one of (i) a response time between two messages of the one or more messages, or (ii) a mastery of at least one message.

5. The method of claim 1, wherein determining at least on label for the one or more messages between a user and an interactive agent is based on one or more of the following: (i) content of the one or more messages or (ii) intent of the one or more messages.

6. The method of claim 1, the method further comprising:
    updating, by the one or more processors, a first label of the at least one label for the one or more messages between a user and an interactive agent based, at least in part, on a response to the recovery message.

7. The method of claim 1, wherein the sequence model is a Markov sequence model.

8. A computer program product comprising:
    one or more computer-readable storage media and program instructions stored on the one or more computer-readable storage media, the program instructions comprising:
    program instructions to retrieve one or more messages from a conversation between a user and an interactive agent;
    program instructions to determine at least one label for the one or more messages between a user and an interactive agent;
    program instructions to compare the at least one label for the one or more messages to a sequence model;
    program instructions to identify the one or more messages from the conversation provided by the user indicate an exit condition for the user based, at least in part, on the comparison of the at least one label for the one or more messages to the sequence model; and
    program instructions to send a recovery message to the user to redirect the conversation, wherein (i) the recovery message includes a rephrasing of at least one of the one or more messages from the conversation between the user and the interactive agent and (ii) the recovery message is based, at least in part, on the exit condition associated with the one or more messages from the conversation provided by the user.

9. The computer program product of claim 8, wherein program instructions to identify the one or more messages from the conversation indicate an exit condition further comprises:
program instructions to determine at least one likelihood of a next state in the sequence model.

10. The computer program product of claim 9, wherein the at least one likelihood of a next state in the sequence model is based, at least in part, on a matching sequence between (i) the at least on label for the one or more messages between a user and an interactive agent and (ii) at least one sequence in the sequence model.

11. The computer program product of claim 10, wherein the at least one likelihood of a next state in the sequence model is further based, at least in part, on at least one of (i) a response time between two messages of the one or more messages, or (ii) a mastery of at least one message.

12. The computer program product of claim 8, wherein program instructions to determine at least on label for the one or more messages between a user and an interactive agent is based on one or more of the following: (i) content of the one or more messages or (ii) intent of the one or more messages.

13. The computer program product of claim 8, the program instructions further comprising:
program instructions to update a first label of the at least one label for the one or more messages between a user and an interactive agent based, at least in part, on a response to the recovery message.

14. The computer program product of claim 8, wherein the sequence model is a Markov sequence model.

15. A computer system for comprising:
one or more computer processors;
one or more computer readable storage media; and
program instructions stored on the computer readable storage media for execution by at least one of the one or more processors, the program instructions comprising:
program instructions to retrieve one or more messages from a conversation between a user and an interactive agent;
program instructions to determine at least one label for the one or more messages between a user and an interactive agent;
program instructions to compare the at least one label for the one or more messages to a sequence model;
program instructions to identify the one or more messages from the conversation provided by the user indicate an exit condition for the user based, at least in part, on the comparison of the at least one label for the one or more messages to the sequence model; and
program instructions to send a recovery message to the user to redirect the conversation, wherein (i) the recovery message includes a rephrasing of at least one of the one or more messages from the conversation between the user and the interactive agent and (ii) the recovery message is based, at least in part, on the exit condition associated with the one or more messages from the conversation provided by the user.

16. The computer system of claim 15, wherein program instructions to identify the one or more messages from the conversation indicate an exit condition further comprises:
program instructions to determine at least one likelihood of a next state in the sequence model.

17. The computer system of claim 16, wherein the at least one likelihood of a next state in the sequence model is based, at least in part, on a matching sequence between (i) the at least on label for the one or more messages between a user and an interactive agent and (ii) at least one sequence in the sequence model.

18. The computer system of claim 17, wherein the at least one likelihood of a next state in the sequence model is further based, at least in part, on at least one of (i) a response time between two messages of the one or more messages, or (ii) a mastery of at least one message.

19. The computer system of claim 15, wherein program instructions to determine at least on label for the one or more messages between a user and an interactive agent is based on one or more of the following: (i) content of the one or more messages or (ii) intent of the one or more messages.

20. The computer system of claim 15, the program instructions further comprising:
program instructions to update a first label of the at least one label for the one or more messages between a user and an interactive agent based, at least in part, on a response to the recovery message.

* * * * *